United States Patent [19]
Nurse, Jr.

[11] Patent Number: 6,129,837
[45] Date of Patent: Oct. 10, 2000

[54] WASTE WATER TREATMENT FILTER INCLUDING A WASTE WATER LEVEL CONTROL ALERT DEVICE

[76] Inventor: Harry L. Nurse, Jr., 10409 Watterson Trail, Louisville, Ky. 40299

[21] Appl. No.: 09/187,765

[22] Filed: Nov. 6, 1998

[51] Int. Cl.$^7$ .................................................. B01D 36/04
[52] U.S. Cl. .......................... 210/86; 210/121; 210/238; 210/532.2
[58] Field of Search ................... 210/532.1, 532.2, 210/86, 121, 104, 237, 238; 73/305–308, 866.5; 116/110

[56] References Cited

U.S. PATENT DOCUMENTS

| | | |
|---|---|---|
| 2,900,084 | 8/1959 | Zabel . |
| 3,332,552 | 7/1967 | Zabel . |
| 3,377,981 | 4/1968 | Hott et al. . |
| 4,364,829 | 12/1982 | Atkins et al. . |
| 4,719,012 | 1/1988 | Groezinger et al. . |
| 4,871,455 | 10/1989 | Terhune et al. . |
| 5,482,621 | 1/1996 | Nurse . |
| 5,569,387 | 10/1996 | Browne et al. . |

*Primary Examiner*—W. L. Walker
*Assistant Examiner*—David Sorkin
*Attorney, Agent, or Firm*—Middleton & Reutlinger; Charles G. Lamb

[57] ABSTRACT

A filtration device for a waste water treatment tank is provided with a level alert device positioned within the filter to provide a warning or alarm when the filter becomes plugged. The level alarm device is positioned so that as the waste water level gets beyond a certain preselected limit an alarm will actuate a micro-switch which is in actuating relation with an alarm device outside the waste water treatment tank.

5 Claims, 4 Drawing Sheets

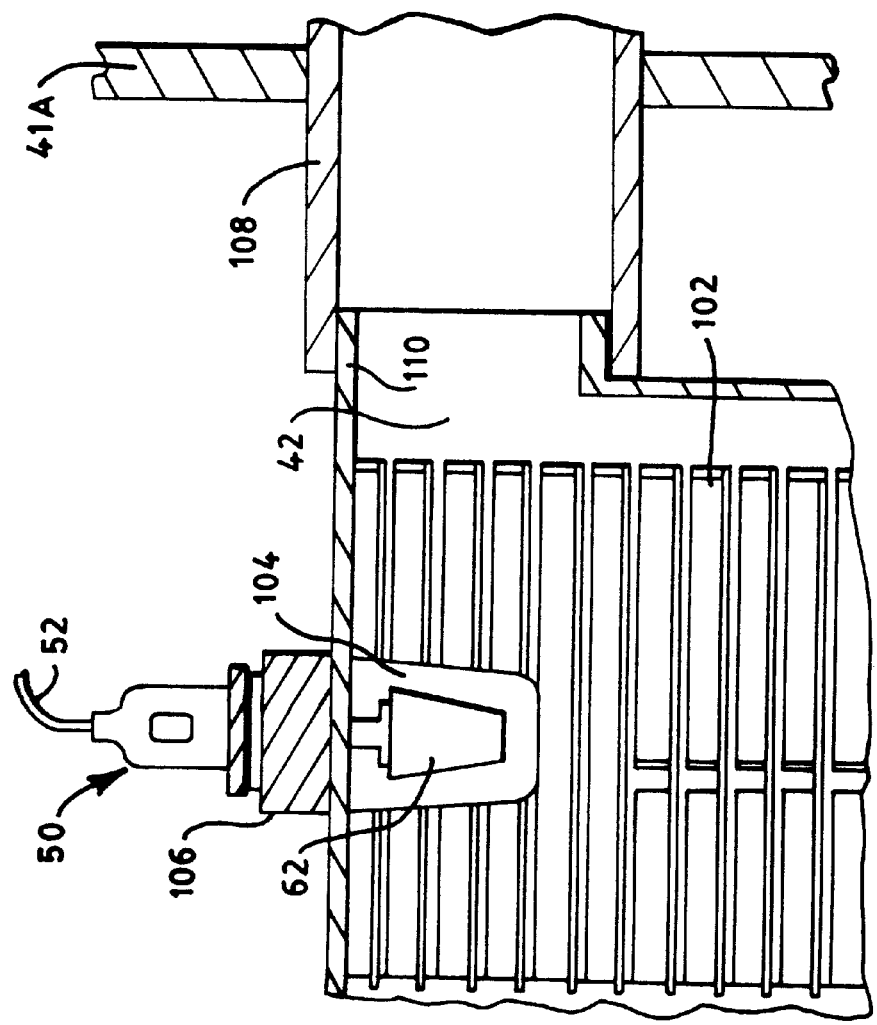
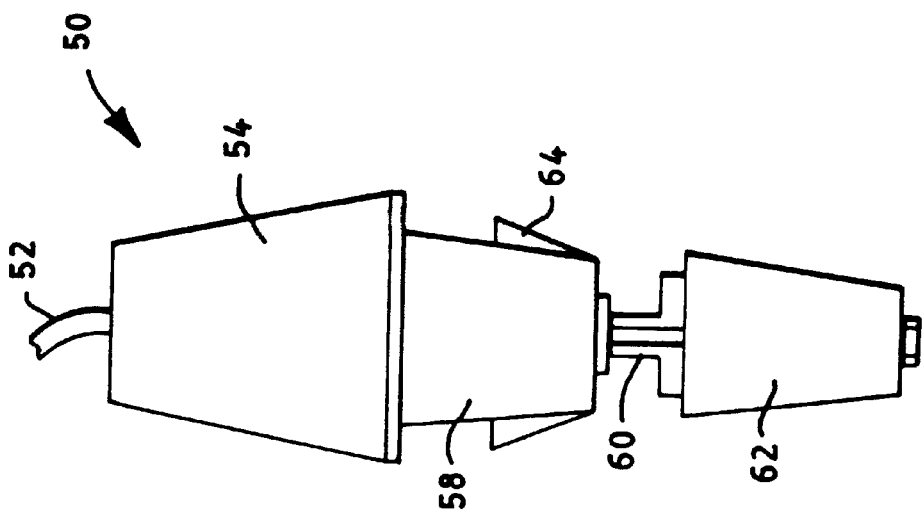
FIG. 8
FIG. 7

WASTE WATER TREATMENT FILTER INCLUDING A WASTE WATER LEVEL CONTROL ALERT DEVICE

BACKGROUND OF THE INVENTION

The present invention relates to filter devices for waste water treatment tanks, and more particularly, to a level control alarm in combination with a filter element for a waste water treatment facility.

A large number of treatment devices are known for use in combination with a waste water treatment tank to remove particulates or solid materials therein. One particular useful filter for use in combination with waste water treatment tanks is described in U.S. Pat. No. 5,382,357. This filter is conveniently provided in flow communication with an outlet from the waste water treatment tanks. However, no matter how satisfactorily designed these prior art filters are, most of them become clogged with particulate materials over a given period of time. And, the fact that a filter device is clogged is usually not discovered until after the stagnant level within the tank rises sufficiently above the lowest inlet level into the tank, thereby preventing the incoming waste water from flowing into the tank.

SUMMARY OF THE INVENTION

It is an object of the present invention to provide a level alert device for a filter element for a waste water treatment tank.

It is also an object of the present invention to provide a level alert device for a filter element which is easily installed and removed from a filter element.

It is a further object to provide a level alert device for a vertically extending tubular filter element wherein the inlet into the filter element is through a central opening in the bottom of the filter and the fluid to be treated flows upwardly through the filter and out through openings provided in the sidewall of the filter wherein the outwardly flowing fluid is in flow communication with an outlet for a waste water treatment tank.

More particularly, in one aspect the present invention is directed to a high level alert device for a filtration system in a waste water disposal tank using a tubular filter element disposed within a filter housing having an open bottom inlet and a filter housing outlet in flow communication with a tank outlet. The tubular filter element is provided with a central opening and an open bottom mounted in the filter housing and positioned so that waste water flows upward through the filter element. The filter element is further provided with a sidewall having openings therein of preselected size to filter out particulates in the waste water. A level alert device extends through the top of the filter element and is positioned at a preselected level within the central opening. The filter element is provided with means for mounting the level alert device therein.

In another aspect, the present invention is directed to means to mount a level alert device in a filter element wherein the level alert device is responsive to the level of stagnant or unfiltered waste water in the tank.

Other objects and advantages of the present invention will become obvious to those skilled in the art upon reading the disclosure set forth in the description of the preferred embodiment as described hereinafter.

BRIEF DESCRIPTION OF THE DRAWINGS

FIG. 7 is a side view of a level alert device used in the present invention; and, FIG. 8 is a partial sectional view of a level alert device of the present invention mounted onto another preferred filter.

DETAILED DESCRIPTION OF THE PREFERRED EMBODIMENT

Figure 2:
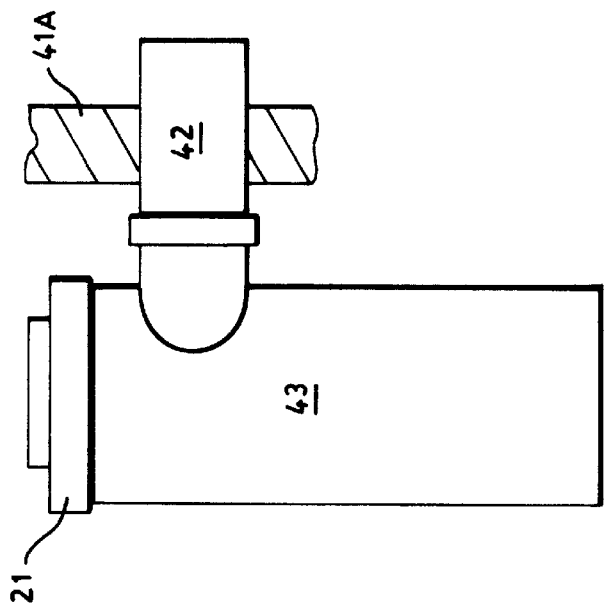
FIG. 2 is an enlarged detailed view showing the housing for one filter element and level alert device of the present invention.
Figure 1:
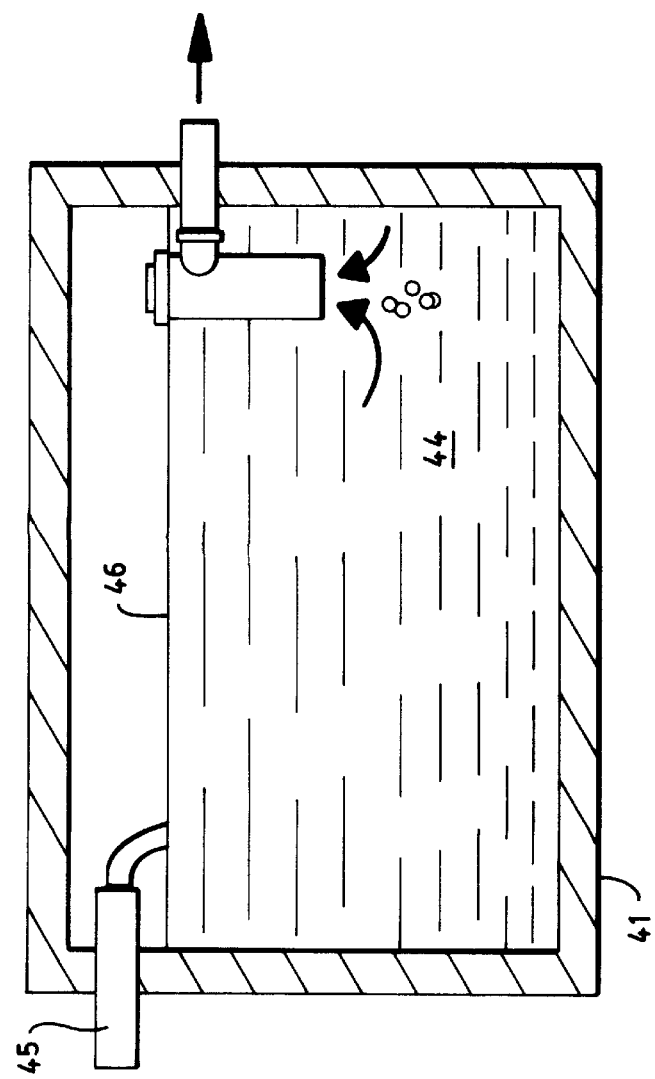
FIG. 1 is a cross-sectional elevational view of one preferred device of the present invention in a waste water treatment application.

FIG. 1 shows a filter housing 43 which includes a filter element therein, the filter element and housing 43 being disposed within a waste water treatment tank 41. Waste water to be filtered is admitted to the tank 41 through an inlet 45 and a level 46 of the waste water is maintained in the filter housing 43 with filtered liquid being emitted from the tank 41 through an outlet 42. FIG. 2 is an enlarged view showing the filter element housing 43 in place and in flow communication with the waste water treatment tank outlet 42 extending through a sidewall 41A of the tank 41.

Figure 3:
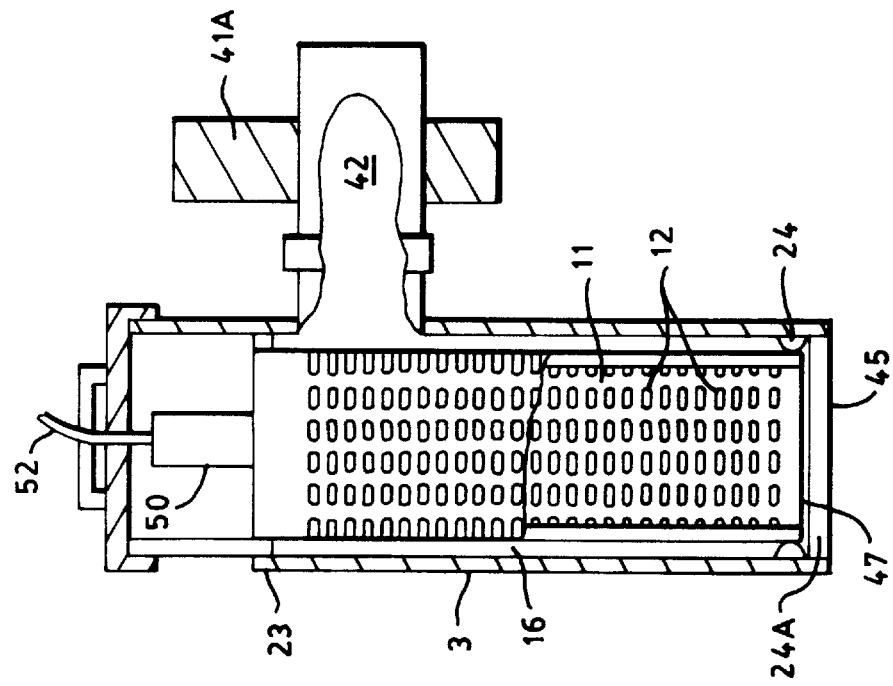
FIG. 3 is an enlarged detailed view, in section, of the level alert device of the present invention disposed within a tubular filter element of the housing shown in FIG. 2.

Referring now to FIG. 3, FIG. 3 shows one preferred filter element 11 in combination with a level alert device identified by the numeral 50. The tubular filter element 11 is provided with horizontally extending slots 12 therein which prevent the flow of particulates of a preselected size from flowing therethrough. The slots 12 extend circumferentially around the tubular element 11 and the width of the slots are such as to be advantageously equal to the maximum mean diameter of the particles which can pass through.

It has been found that the slots in the tubular filter element 11 can be located in virtually any orientation and that the filtration can be successfully accomplished regardless of the orientation of the slots.

Figure 4:
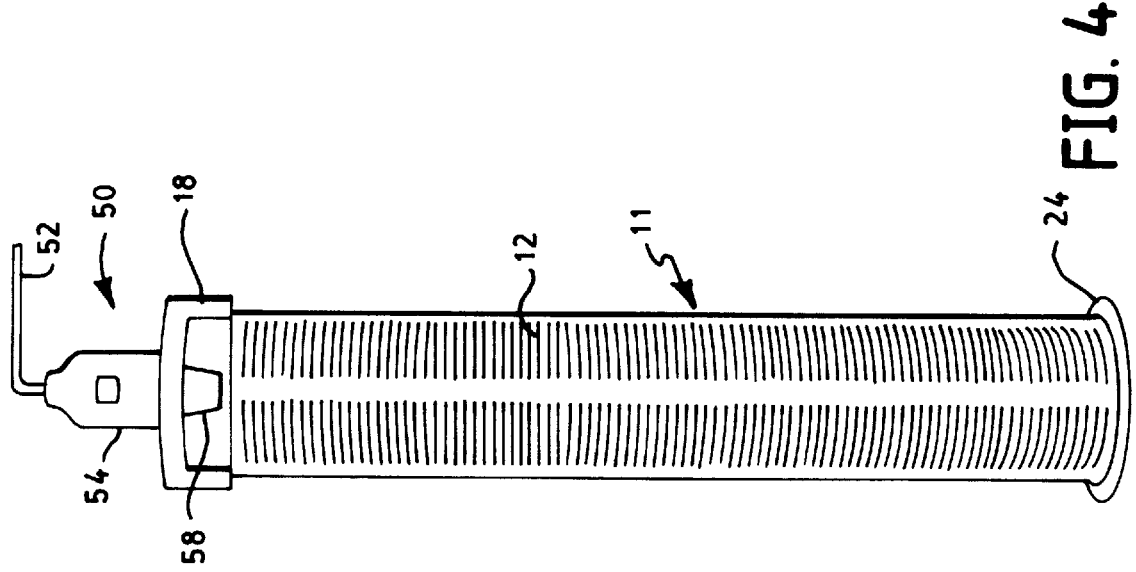
FIG. 4 is a perspective view of a tubular filter element and level alert device of the present invention.

As shown in FIGS. 3 and 4, the tubular filter element 11 is received within the housing 43 with a space being defined between the outer surface of the tubular filter element 11 and the inner surface of the housing 43 thereby defining an annular flow area 16 therebetween. The annular flow area 16 between the filter element 11 and the inner walls of the casing 43 receives the effluent which is passed through the slots 12 of the filter element 11. The tubular filter element 11 is provided with a centrally disposed opening 47 into which the waste water to be treated flows. The tubular filter element 11 is provided with a flexible sealing ring 24, preferably an "O" ring, at a lower extremity thereof which is in mating relation with a flange 24A which is disposed circumferentially along the inner surface at a terminating lower end of the housing 43. The sealing arrangement between the "O" ring 24 and the flange 24A prevents the upper flow of effluent along the annular flow area 16 thereby forcing all of the effluent to flow up through the interior of the tubular element 11.

At the upper end of the tubular element 11, a circumferentially extending flange portion 23 is provided for support of the tubular element 11 within the filter housing 43. The outer diameter of the flanged portion 23 is generally substantially the same as the inner diameter of the housing 43 thereby providing for a snug fit between the filter element 11 within the housing 43. The housing 43 may also be provided with a cap 21 thereon wherein the cap 21 is provided with an opening therethrough to receive the power line 52 for a level alert device 50.

Figure 6:
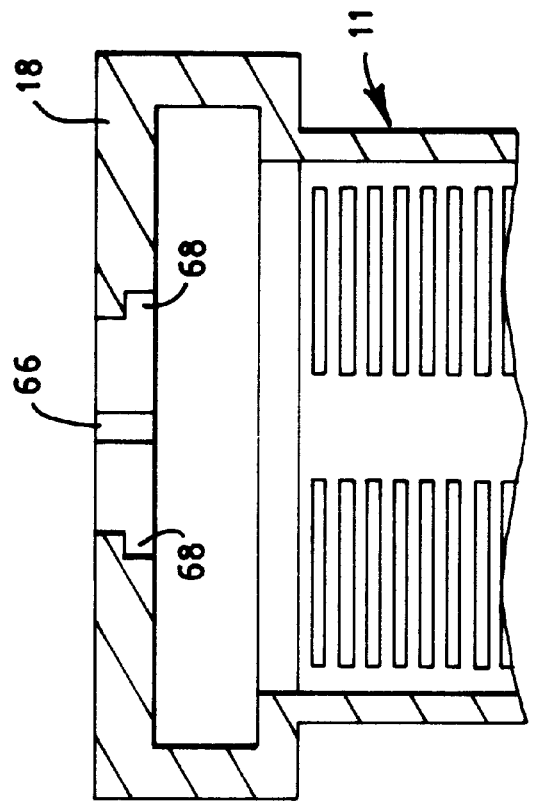
FIG. 6 is a partial sectional view taken along line 6—6 in FIG. 5.
Figure 5:
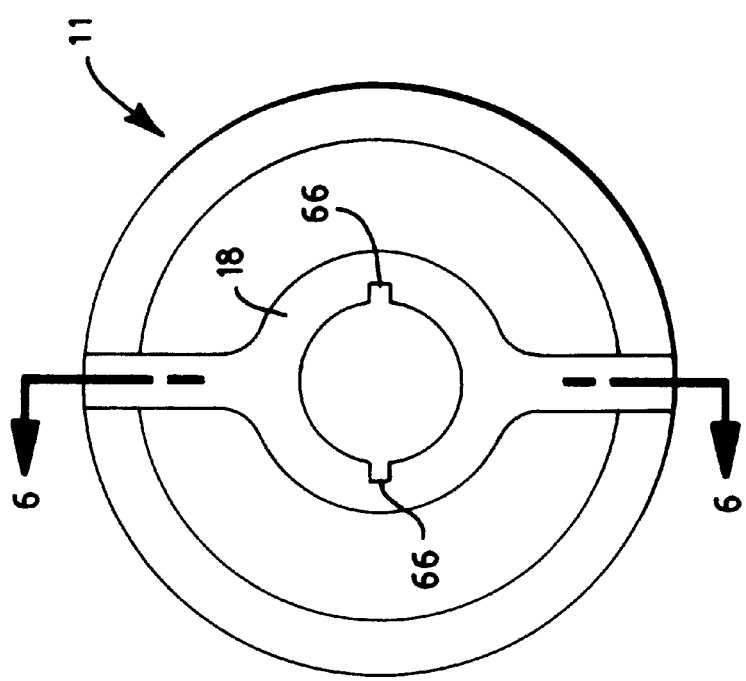
FIG. 5 is an enlarged top view of the filter element and level alert device of FIG. 4.

As shown in FIGS. 5–7, the level alert device 50 or alerting means is responsive to a high level of the waste water 46 within the tubular filter element 11. It is realized that any suitable form of alarm or control may be used which is sensed outside of the waste water treatment tank. The preferred alerting device is a simple flow-control type of device which is in communication with a micro-switch which, in turn, activates an alarm at a preselected location outside the waste water treatment tank.

Accordingly, a float 62 is provided on the lower end of a level alert device 50 which is provided with an upper housing 54 and a lower housing 58, lower housing 58 having an outer diameter less than the outer diameter of the upper housing 54. Within the housings 54 and 58 are connections (not shown) to the power line 52 and a micro-switch (not shown) which is actuated in response to the position of the movable rod 60 attached to the float 62. In operation, the float 62 forces the rod 60 inwardly to a preselected position where a micro-switch is activated therefore setting off an alarm or other signaling device which is at a preselected location outside the waste water treatment tank.

The preferred level control device 50 is provided with a pair of tapered locking lugs 64 located along a conical portion of the lower housing 58 wherein the lugs 64 extend angularly inwardly in a downward direction. The lugs 64 are received within elongated grooves 66 which extend the entire thickness of handle 18 for mounting into the handle. The handle 18 is further provided with lug receiving or locking slots 68 which are positioned 90° from the grooves 66 wherein the slots 68 are of a preselected cross-sectional area which is the same as the cross-sectional area of the top portion of the lugs 64. The depth of the slots 68 are less than the total thickness of the handle 18.

In the mounting of the level control 50 within the tubular filter element 11, lugs 64 are aligned with the grooves 66 and the level control device is then forced downwardly through and past the grooves. Once the lugs 64 have passed downwardly beyond the terminating end of the slots 66, the level control device 50 is turned 90°, in either direction, until the lugs 64 are in mating relation with the lug locking slots 68 in which they are received.

In operation, the level alert float 62 floats within the central portion of the tubular filter element 11 until the slots in the filter tubular element become clogged. At this point the effluent rises within the central portion of the tubular filter element 11 thereby forcing the float 62, and in turn the movable rod 60, upwardly until the movable rod 60 engages with a micro-switch in the device 50 thereby setting off an alarm or the like advising that the filter is clogged and therefore needs to be cleaned.

In removing the filter tubular element from the housing 43, the level control device is forced downwardly a preselected distance sufficient to disengage the lugs 64 from the lug locking slots 68 and the level alert device 50 is then turned approximately 90° until the lugs are in alignment with the grooves 66. Once the lugs 64 are in alignment with the grooves 66, the level control device is then easily removable by pulling upwards. Once the filter has been removed and cleaned, the tubular element may then be reinserted into the tubular housing 43 and the level control device 50 reinserted as described previously.

It is realized that the level alert device may also be mounted onto the outside of a filter such as a disc-dam filter as shown in U.S. Pat. No. 2,900,084 and U.S. Pat. No. 3,332,552. A partial sectional view of one of these types of filters with a level alert device is shown in FIG. 8. As shown, a disc-dam filter, identifiable by numeral 102 is provided with a cut-out section 104 which receives the level alert device 50 therein. The level alert device 50 is received by level alert mounting housing 106 on the top thereof which includes grooves and lug locking slots substantially the same as and positioned substantially as those as shown in the handle 18, FIGS. 5 and 6, as discussed previously. The mounting of the level alert device 50 is also in the same manner as described previously for mounting the level alert device 50 in the handle 18. Also as shown in FIG. 8, filter 102 is provided with a collar 108 for receiving a sleeve 110 on the inside terminating end of outlet 42 for mounting the fluid outlet side of filter 102 to waste water discharge outlet 42.

It will be realized that various changes may be made to the specific embodiments shown and described without departing from the principals and spirit of the present invention.

What is claimed is:

1. In a combination of a filter device with a high level alert device mounted in a waste water treatment tank, the improvement comprising:

a) mounting means for mounting said high level alert device to said filter device in an unfiltered waste water side of said filter device, said mounting means being integral with said filter device;

b) said high level alert device having a floating lower end mounted within a lower housing portion of said high level alert device, said lower housing portion having an inverted conical lower end with a pair of outwardly extending tapered locking lugs spaced radially around said conical end, said high level alert device having an upper housing portion of a greater diameter than said lower housing portion, said upper housing portion being in actuating communication with an alarm device;

c) said mounting means having an opening therein to receive said level alert device therethrough, said mounting means having vertically extending lug receiving grooves extending the vertical thickness of said mounting means in mating relation with said locking lugs, said mounting means having a bottom circumscribing said opening with a pair of lug locking slots spaced radially from said lug receiving grooves, said lug locking slots having a depth less than the thickness of said mounting means.

2. The combination of claim 1, wherein said lugs are spaced on opposite sides of said conical end, said lug receiving grooves being spaced on opposite sides of said opening in a handle and said lug locking slots being on opposite sides of said opening in said handle and 90° from said lug receiving grooves.

3. The combination of claim 1, said mounting means being a handle of a filter element.

4. In combination with a waste water disposal tank having a waste water tank inlet and a waste water outlet, a filtration system and a high level alert device comprising:

a) a filter housing having an open bottom in flow communication with said tank inlet and a housing outlet in flow communication with said tank outlet;

b) a filter element having a central opening and an open bottom mounted in said filter housing and positioned so that waste water flows upward through said filter element, said filter element having a sidewall with openings therein of preselected size, said filter element having a handle along the top of said filter element; and, c) said high level alert device extending through the top of said filter element at a preselected position within said central opening, the high level alert device having a floating lower end mounted within a lower housing portion of said high level alert device, said lower housing portion having an inverted conical lower end with a pair of outwardly extending tapered locking lugs spaced radially around said conical end, said high level alert device having an upper housing portion of a diameter greater than said lower housing portion, said upper housing portion being in actuating communication with an alarm device; said handle having an opening therein to receive said high level alert device therethrough, said handle having vertically extending lug receiving grooves extending the vertical thickness of said handle in mating relation with said locking lug, said handle having a bottom circumscribing said opening in said handle with a pair of lug locking slots spaced radially from said lug receiving grooves, said lug locking slots having a death less than the thickness of said handle.

5. The combination of claim 4 wherein said lugs are spaced on opposite sides of said conical end, said lug receiving grooves being spaced on opposite sides of said opening in said handle and said lug locking slots being on opposite sides of said opening in said handle and 90° from said lug receiving grooves.

\* \* \* \* \*